United States Patent [11] 3,595,534

| [72] | Inventor | Robert F. Burton<br>3141 Wynn Drive, Avondale Estates, Ga.<br>30002 |
|---|---|---|
| [21] | Appl. No | 773,791 |
| [22] | Filed | Nov. 6, 1968 |
| [23] | | Division of Ser. No. 666,077, Sept. 7, 1967,<br>Pat. No. 3,444,626 |
| [45] | Patented | July 27, 1971 |

[54] BLENDING DEVICE
4 Claims, 5 Drawing Figs.

| [52] | U.S. Cl. | 259/85 |
|---|---|---|
| [51] | Int. Cl. | B28c 5/24 |
| [50] | Field of Search | 259/85, 84,<br>82, 81, 89, 90, 121, 109, 110; 134/117, 120, 132.<br>200; 21/91 |

[56] References Cited
UNITED STATES PATENTS

| 2,961,224 | 11/1960 | Wright | 259/109 X |
|---|---|---|---|
| 2,495,379 | 1/1950 | McIntosh | 259/89 X |
| 3,090,602 | 5/1963 | Benton | 259/81 X |
| 3,031,807 | 5/1962 | Bylsma et al | 134/120 |
| 3,088,179 | 5/1963 | Leuthner | 21/91 |

*Primary Examiner*—Walter A. Scheel
*Assistant Examiner*—Leon G. Machlin
*Attorney*—Jones & Thomas ABSTRACT: What is disclosed herein is a blending device for blending a particle substance such as soil with a second substance such as a fluid or solid particles. The embodiment of the blending device disclosed is a sealable and rotatable drum having deflecting plates within and rotatable with the drum. The deflecting plates are shaped and positioned to cause cascading of a particle substance dropping downwardly through a fluid after being carried upwardly by rotation of the drum and to provide a blending device well suited to the blending of soil with a fluid such as a soil-conditioning chemical and to other uses.

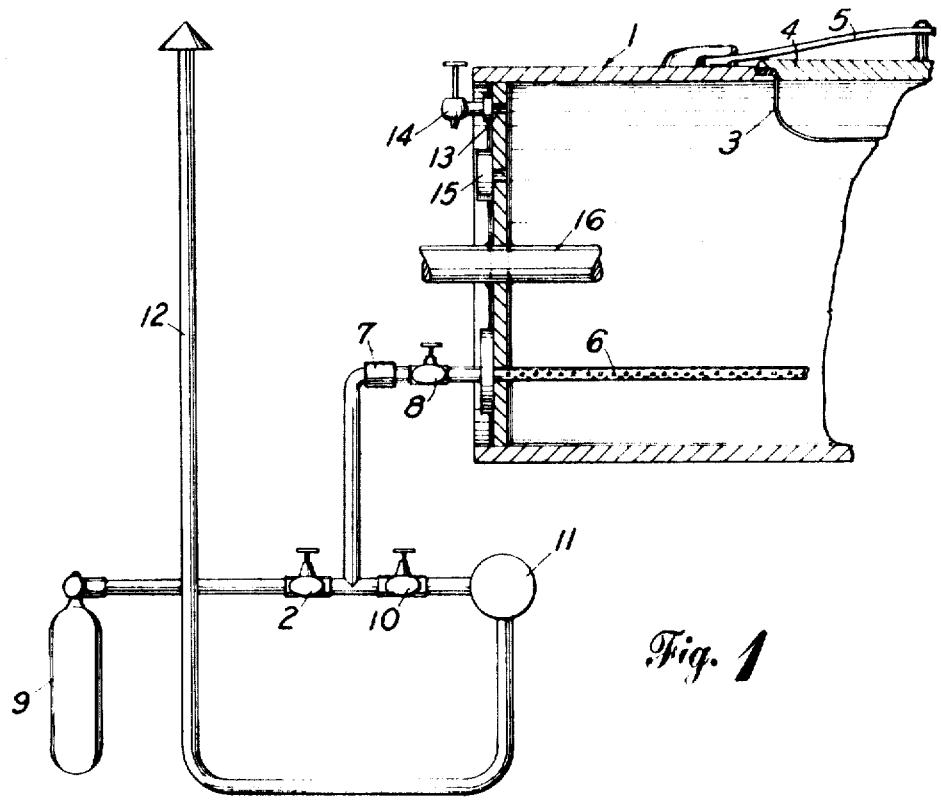
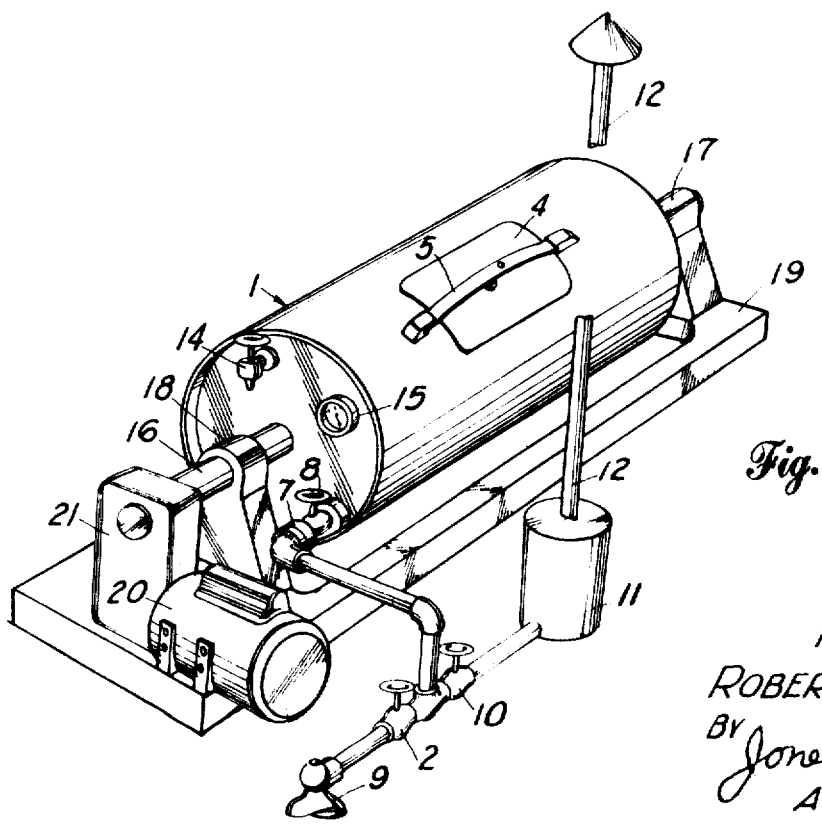
Fig. 1
Fig. 2
INVENTOR
ROBERT F. BURTON
BY Jones & Thomas
ATTORNEYS INVENTOR
ROBERT F. BURTON
BY Jones & Thomas
ATTORNEYS

BLENDING DEVICE

CROSS-REFERENCE TO RELATED APPLICATION

This application is a division of copending U.S. Pat. application Ser. No. 666,077, filed on Sept. 7, 1967 now U.S. Pat. No. 3,444,626, issued May 20, 1969.

BACKGROUND OF THE INVENTION

1. Field of the Invention

The invention disclosed herein relates to the blending of a particle substance with a second substance such as fluid or solid particles, and more particularly, to a blending device for blending a particle substance such as soil with a fluid by cascading the particles of the particle substance downwardly through the fluid.

2. Description of the Prior Art

There is a continuing and growing requirement for blending devices and in particular, for blending devices by which a particle substance such as soil can be blended with one or more fluids to provide a conditioned soil which is substantially free of living matter such as fungi, insects, plants and plant seeds. This is because such conditioned soil is essential to establishing and maintaining golf course greens, to commercial gardening, and to other similar agricultural uses.

The manner in which conditioned soil is obtained for maintaining golf course greens is typical of the prior art. In the obtaining of conditioned soil for maintaining golf course greens, it has been customary in the prior art to spread a relatively thin layer of soil over a surface, to cover the layer of soil with a cover of plastic or similar material, to inject a heavier than air soil-conditioning chemical under the cover, and to provide a period of time for the soil-conditioning chemical to diffuse and be effective throughout the layer of soil and a subsequent period of time after removal of the cover for the soil-conditioning chemical to diffuse from the layer of soil into the atmosphere.

The difficulty with obtaining conditioned soil for maintaining golf course greens by this prior art method is that it is necessary to provide approximately 24 hours for the soil-conditioning chemical to diffuse through the layer of soil to insure that living matter in the soil is no longer living. In addition, it is necessary to provide approximately 36 hours for the soil-conditioning chemical to diffuse from the soil into the atmosphere to insure substantial removal of the soil-conditioning chemical into and out of a layer of soil, difficulties and delays are frequently encountered because of holes in the cover and because the entire method and required apparatus are rather cumbersome.

Furthermore, the conditioning of soil by this prior art method is hazardous and is expensive because practical amounts of conditioned soil require the use of a relatively large number of people and of a relatively large amount of soil-conditioning chemical. This prior art method is also restricted to the use of soil-conditioning chemicals which are heavier than air so that they diffuse downwardly into the covered layer of soil.

SUMMARY OF THE INVENTION

The invention disclosed herein solves these and other difficulties encountered in the prior art with respect to the conditioning of soil as described above and with respect to other requirements for blending a particle substance such as soil with a fluid such as a soil-conditioning chemical. This is because the invention provides a blending device for a soil-conditioning method or apparatus by which conditioned soil is easily and conveniently obtained in several hours for use in maintaining golf course greens and for other agricultural uses. When used with a soil-conditioning method or apparatus, the invention provides a soil-conditioning method or apparatus that requires only a small amount of soil-conditioning chemical relative to that required in the prior art and in which the soil conditioning chemical need not be heavier than air. Moreover, the invention permits hazardous soil-conditioning chemicals to be safely used and provides a soil-conditioning apparatus that requires relatively few people. As a result of the few people required and the small amount of soil-conditioning chemical required, the invention provides a soil-conditioning apparatus by which conditioned soil is provided at a fraction of the cost at which conditioned soil is provided in the prior art.

The invention provides these improvements in soil conditioning by providing a blending device for cascading or otherwise dispersing a quantity of soil through a concentrated soil-conditioning chemical, applying a vacuum to the quantity of soil to remove soil-conditioning chemical from the soil, and cascading the quantity of soil through air to rinse soil conditioning chemical from the soil. The invention is readily used to a method of soil conditioning which includes the steps of placing a quantity of soil under a vacuum to remove all but a small residual amount of air from the quantity of soil, cascading the quantity of soil through a soil-conditioning chemical diluted only by the small amount of residual air, and alternately apply a vacuum to the quantity of soil and cascading the quantity of soil through air until substantially all of the soil-conditioning chemical is removed from the quantity of soil.

The embodiment of the invention disclosed herein is a blending device which has a rotatable drum and a plurality of deflecting plates and which serves as a cascading means for cascading soil within an enclosure in a soil-conditioning apparatus that also includes a vacuum means for applying a vacuum to soil within the enclosure, and an environment means for selectively providing an environment of air or soil-conditioning chemical to soil within the enclosure. When used in the conditioning of soil, the invention provides for the conditioning of soil in a rapid, efficient, safe and relatively inexpensive manner which has not been achieved in the prior art.

BRIEF DESCRIPTION OF THE DRAWING

These and other features and advantages of the invention will be more clearly understood from the following detailed description and the accompanying drawing in which like characters of reference designate corresponding parts throughout and in which:

FIG. 1 is a schematic presentation of a blending device embodying the invention disclosed herein and arranged with other devices to provide an apparatus for the conditioning of soil;

FIG. 2 is a perspective view of the blending device in the apparatus shown in FIG. 1;

DESCRIPTION OF EMBODIMENTS

Figure 3:
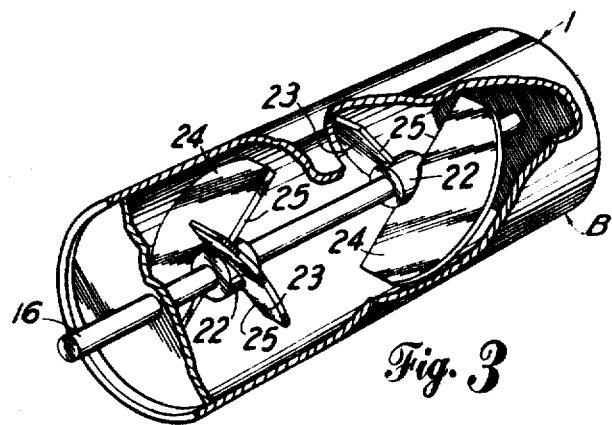
FIG. 3 is a perspective view partially cutaway of the blending device shown in FIG. 1 and FIG. 2.

These figures and the following detailed description disclose an embodiment of the invention disclosed herein. However, it should be understood that the invention is not limited to the embodiment disclosed herein since it may be embodied in other equivalent forms.

The invention disclosed herein is most easily understood in terms of its use in an apparatus or a method of conditioning soil. From FIG. 1 it will be seen that the apparatus for conditioning soil includes a drum 1 having an opening 3 which is closed by a self-sealing closure plate 4 and a latching device 5. Extending through one end of the drum and along the length of the drum is a filter pipe 6 having a valve 8 at its extending end to which a quick disconnect coupling 7 is easily and conveniently connected. The filter pipe 6 is conventional and provides for the flow of a gas into and out of the drum 1.

The coupling 7 is connected through a valve 2 to a flask or container 9 of a soil-conditioning chemical such as methyl bromide and through a valve 10 to a vacuum pump 11 having its discharge through a pipe 12. An air tube 13 extends into the drum 1 through a valve 14 and a pressure gauge 15 is mounted in conventional manner on the drum 1 to measure gas pressure within the drum 1.

The drum 1 is fixedly mounted on a shaft 16 having its centerline coinciding with the centerline of the drum 1 and as shown in FIG. 2, the extending ends of the shaft 16 are positioned within bearing blocks 17 and 18 mounted on a base 19. As also shown in FIG. 2, a motor 20 is operatively connected to the shaft 16 through a reduction gear 21 so that upon operation of the motor 20, the drum 1 is rotated.

As is best seen in FIG. 3, a plurality of collars 22 are fixedly positioned on the shaft 16 within the drum 1 and each collar 22 has a plurality of deflecting plates 23 and 24 mounted on it. Each of the deflecting plates 23 and 24 is an elongated substantially flat plate which is mounted at the midpoint of an elongated side 25 to a collar 22 so that the long axis of its substantially flat surface parallel to the side 25 is inclined to the centerline of the shaft 16 and so that the short axis of the surface perpendicular to the long axis is substantially perpendicular to the centerline of the shaft 16. As is also best shown by FIG. 4, the deflecting plate 23 and the deflecting plate 24 mounted on each collar 22 are inclined at approximately 45° in opposite directions to the centerline of the shaft 16.

The drum 1, the shaft 16, and the deflecting plates 23 and 24 rotate as a unit upon rotation of the shaft 16 by the motor 20 through the reduction gear 21 and provide a blending device B which is an embodiment of the invention disclosed herein. In the apparatus for conditioning soil described above, the blending device B serves as a cascading means for cascading soil through an enclosure. This will be understood from FIGS. 4 and 5.

Figure 4:
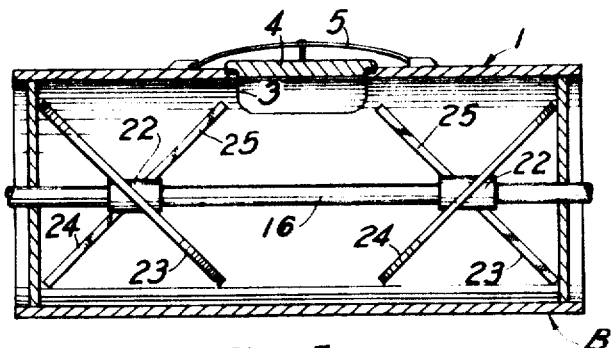
FIG. 4 is a cross-sectional view of the blending device shown in FIG. 3.

From FIG. 4, it will be seen that when the drum 1 is in the position in which the elongated sides 25 of the deflecting plates 23 and 24 are in substantially parallel vertical planes of reference, soil falling downwardly within the drum 1 cascades to the right as seen in FIG. 4 along the surfaces of the deflecting plates 23 and to the left as shown in FIG. 4 along the surfaces of the deflecting plates 24. It will be understood that soil is carried upwardly by rotation of the drum 1 and that when the drum 1 is rotated 180° from the position shown in FIG. 4, soil cascades downwardly along the surfaces of the deflecting plates 23 and 24 in directions opposite to those shown in FIG. 4.

Figure 5:
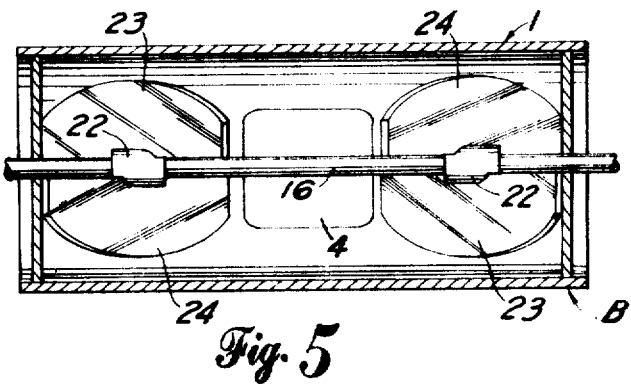
FIG. 5 is a cross-sectional view of the blending device shown in FIG. 3 but with the deflecting plates in different positions than those shown in FIG. 4.

FIG. 5 shows the drum 1 rotated 90° from the position shown in FIG. 4 and it will be seen from FIG. 5 that with the drum 1 in this position, soil dropping downwardly within the drum 1 also cascades along the surfaces of the deflecting plates 23 and 24. However, it will be noted from FIG. 5 that with the deflecting plates in this intermediate position between that position shown in FIG. 4 and that position which is 180° from that position shown in FIG. 4, the soil is not cascaded to the right or left along the length of the drum 1. Between that position of the drum 1 shown in FIG. 4 and that shown in FIG. 5, soil is cascaded to the right or left along the length of the drum 1 by varying amounts.

It has been found that with the rotating drum 1 and the inclined deflecting plates 23 and 24 which continuously change position relative to soil falling downwardly within the drum 1, soil or other solid material within the drum 1 is continuously moved by a cascading action back and forth along the length of the drum 1. The result is not only a cascading action but also a thorough and complete blending of soil with a fluid or other material within the drum 1.

In using the blending device B in an apparatus for conditioning soil for use in maintaining golf course greens and other uses, a quantity of soil is placed within the stationary drum 1 through the opening 3 and the drum 1 is closed by the closure plate 4. The coupling 7 is connected to the valve 8, the valves 8 and 10 opened, and the pump 11 operated until the pressure gauge 15 indicates that air has been removed from the drum 1 and the quantity of soil to such an extent that there is substantial vacuum within the drum 1. It has been found that using a pump 11 of one horsepower and with approximately a cubic yard of soil filling the drum 1 to approximately 60 to 70 percent of its capacity, a vacuum of approximately 20 minutes.

Once substantially all of the air has been removed from the quantity of soil within the drum 1 by the operation of the pump 11, the valve 10 is closed and the valve 2 is opened to deliver a gaseous soil-conditioning chemical in the container 9 into the drum 1. When the pressure gauge 15 indicates that the pressure of the soil-conditioning chemical and residual air within the drum 1 and substantially equal to atmospheric pressure, the valves 2 and 8 are closed and the coupling 7 is disconnected from the valve 8. It will be understood that the pressure within the drum 1 is sufficiently less than atmospheric pressure to insure that the self-sealing closure plate 4 is operative and that the sealed drum 1 prevents injury from the soil-conditioning chemical.

With the quantity of soil in an environment of substantially pure concentrated soil-conditioning chemical within the drum 1, the drum 1 is rotated by operation of the motor 20. As the drum 1 rotates, the quantity of soil within the drum 1 is continuously cascaded through and blended with the soil-conditioning chemical by the cascading action of the drum 1 and deflecting plates 23 and 24. It has been found that with the drum 1 rotating at approximately 11 r.p.m. and approximately 60 to 70 percent filled with approximately 1 cubic yard of soil, approximately 30 minutes of cascading the soil through an environment of commercially available methyl bromide and the residual air remaining in the drum after a vacuum of approximately 25 inches of mercury will substantially destroy all living matter in the soil.

After cascading a quantity of soil within the drum 1 through a concentrated soil-conditioning chemical for the period of time required to blend the soil with the soil-conditioning chemical and destroy living matter or otherwise condition the soil, rotation of the drum 1 is stopped, the coupling 7 is connected to the valve 8, the valves 8 and 10 are opened, and the pump 11 is operated until the pressure gauge 15 indicates that the soil-conditioning chemical has been removed from the drum 1 and the quantity of soil to such an extent that there is a substantial vacuum within the drum 1.

It should be understood that the pipe 12 is of substantial length to insure that the soil-conditioning chemical is discharged at a location which is sufficiently remote from the drum 1 to avoid hazard from the soil-conditioning chemical in the vicinity of the drum 1. When the pressure gauge 15 indicates a substantial vacuum within the drum 1, the pump 11 is stopped, the valves 8 and 10 are closed, the coupling 7 is disconnected from the valve 8, and the valve 14 is opened to supply air to the drum 1 until the pressure gauge 15 indicates that atmospheric pressure has been achieved within the drum 1.

After sufficient air has entered the drum 1 through the valve 14 for atmospheric pressure to be achieved within the drum 1, the valve 14 is closed and the drum 1 is rotated by operation of the motor 20 to rinse soil-conditioning chemical from the quantity of soil by cascading the quantity of soil through air. Following a period of rinsing, rotation of the drum 1 is stopped, the coupling 7 is connected to the valve 8, the valves 8 and 10 are opened, and the pump 11 is operated until the pressure gauge 15 indicates that a substantial vacuum has been achieved within the drum 1.

When the pressure gauge 15 indicates that a substantial vacuum has been achieved within the drum 1, the pump 11 is stopped, the valves 8 and 10 are closed, the coupling 7 is disconnected from the valve 8, and the valve 14 is opened to supply air to the drum 1 until the pressure gauge 15 indicates that atmospheric pressure has been achieved within the drum 1. With achieving of atmospheric pressure within the drum 1, the valve 14 is closed and the drum 1 is again rotated by operation of the motor 20 to once again rinse soil-conditioning chemical from the quantity of soil by cascading the quantity of soil through air. Following this second period of rinsing, the rotation of the drum 1 is discontinued, the coupling 7 is connected to the valve 8, the valves 8 and 10 are opened, and the pump 11 is operated until the pressure gauge 15 indicates a substantial vacuum has been achieved within the drum 1.

Two rinsing periods each of approximately 3 minutes duration and each proceeded and followed by a vacuum of approximately 25 inches of mercury have been sufficient to remove substantially all methyl bromide from approximately 1 cubic yard of soil filling approximately 60 to 70 percent of the drum 1. However, the number of periods of rinsing may be varied and following the last period of rinsing and the removal of the rinsing mixture by applying a vacuum, the coupling 7 is disconnected from the valve 8, the valves 8 and 10 are closed, the valve 14 is opened to achieve atmospheric pressure within the drum 1, and the drum 1 is rotated into that position which places the opening 3 lowermost to permit emptying of the quantity of soil through the opening 3 into a suitable container or chute (not shown).

It will be understood that the length of time during which soil is cascaded through a soil-conditioning chemical, the length and number of periods of rinsing, the amount of vacuum applied to the soil, and the amount of time required to achieve a vacuum are dependent upon factors such as the condition and quantity of the soil being conditioned, the soil-conditioning chemical used, the size of the drum 1, and the size of the pump 11. Regardless of such factors, conditioned soil is achieved in a few hours when the blending device B is used in the soil-conditioning apparatus or method.

It will also now be understood that when the blending device B is used in a method of conditioning soil the method involves cascading soil through a soil-conditioning chemical, applying a vacuum to the soil to remove soil-conditioning chemical from the soil, and cascading the soil through air to rinse the soil-conditioning chemical from the soil. The specific method of conditioning soil which is described above includes the steps of applying a vacuum to a quantity of soil to remove all but a small amount of residual air from the quantity of soil, cascading or otherwise dispersing the quantity of soil through a soil-conditioning chemical diluted only by the residual air, applying a vacuum to the quantity of soil to remove substantially all of the soil-conditioning chemical is removed from the quantity of soil.

Further, it will now be understood that when the blending device B is used in an apparatus for conditioning soil, the apparatus includes the blending device B as a cascading means for cascading soil through an enclosure, a vacuum means such as the pump 11 for applying a vacuum to a quantity of soil within the enclosure, and an environment means such as the container 9 and the valve 14 for selectively providing an environment of air or soil-conditioning chemical in the enclosure. Moreover, it will be understood that the drum 1 with the deflecting plates 23 and 24 serves to provide a blending device B for blending any substantially solid material such as a quantity of soil with a fluid such as a soil-conditioning chemical.

It will be further understood by those skilled in the art that many variations may be made in the embodiments chosen for the purpose of illustrating the present invention without departing from the scope thereof as defined by the appended claims.

I claim:

1. In a blending device for blending particles, a rotatable shaft having a centerline, a hollow drum mounted on and for rotation with said shaft and having an interior surface, and a plurality of deflecting plates positioned within said drum for rotation with said shaft, each of said deflecting plates being substantially semicircular and having a short axis which is substantially perpendicular to said centerline of said shaft and a long axis which is disposed at an angle of substantially 90° to said short axis and which is disposed at an angle of substantially 45° to said centerline of said shaft, some of said deflecting plates being positioned on one side of said shaft and others of said deflecting plates being positioned on the other side of said shaft, one of said some of said deflecting plates having its short axis coinciding with the short axis of one of said others of said deflecting plates along a first line of reference extending through said shaft and having its long axis disposed at an angle of substantially 90° to the long axis of said one of said others of said deflecting plates, another of said some of said deflecting plates having its short axis coinciding with the short axis of another of said others of said deflecting plates along a second line of reference extending through said shaft and having its long axis disposed at an angle of substantially 90° to the long axis of said another of said others of said deflecting plates and to the long axis of said one of said some of said deflecting plates, and said one of said some of said deflecting plates and said another of said some of said deflecting plates being positioned along said shaft so that the distance between said first line of reference and said second line of reference is less than the length of said shaft within said drum.

2. The blending device of claim 1 including means for rotating said drum about said centerline.

3. The blending device of claim 1 in which the outermost edges of said deflecting plates are in a cylindrical plane of reference having a centerline coinciding with the centerline of said drum.

4. The blending device of claim 3 in which said plane of reference is displaced inwardly from said drum.